(12) United States Patent
Pavlyushchik

(10) Patent No.: US 7,472,420 B1
(45) Date of Patent: Dec. 30, 2008

(54) METHOD AND SYSTEM FOR DETECTION OF PREVIOUSLY UNKNOWN MALWARE COMPONENTS

(75) Inventor: Mikhail A. Pavlyushchik, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 12/108,457

(22) Filed: Apr. 23, 2008

(51) Int. Cl.
*G06F 11/00* (2006.01)
*G06F 12/14* (2006.01)
*G06F 15/18* (2006.01)
*G06F 17/30* (2006.01)

(52) U.S. Cl. .............. 726/24; 726/22; 726/23; 726/25; 713/188; 707/200

(58) Field of Classification Search ............. 726/22–25; 713/188; 707/200
See application file for complete search history.

(56) References Cited

U.S. PATENT DOCUMENTS

| 5,440,723 | A | * | 8/1995 | Arnold et al. .................. 714/2 |
| 6,944,772 | B2 | * | 9/2005 | Dozortsev .................... 713/180 |
| 6,973,577 | B1 | * | 12/2005 | Kouznetsov ................. 726/25 |
| 6,981,279 | B1 | * | 12/2005 | Arnold et al. ................. 726/22 |
| 2002/0083334 | A1 | | 6/2002 | Rogers et al. |
| 2004/0025015 | A1 | * | 2/2004 | Satterlee et al. ............. 713/164 |
| 2005/0240769 | A1 | * | 10/2005 | Gassoway ................... 713/176 |
| 2006/0179484 | A1 | | 8/2006 | Scrimsher et al. |
| 2007/0067843 | A1 | * | 3/2007 | Williamson et al. ........... 726/24 |
| 2007/0150956 | A1 | * | 6/2007 | Sharma et al. ................. 726/24 |
| 2007/0199060 | A1 | * | 8/2007 | Touboul ....................... 726/11 |
| 2008/0016339 | A1 | * | 1/2008 | Shukla ........................ 713/164 |
| 2008/0114957 | A1 | * | 5/2008 | Safa ............................ 711/163 |
| 2008/0172563 | A1 | * | 7/2008 | Stokes ........................ 713/193 |

OTHER PUBLICATIONS

Koike, Ryuiti et al., "Development of System for the Automatic Generation of Unknown Virus Extermination Software," Proceedings of the 2007 International Symposium on Applications and the Internet (SAINT'07), pp. 1-7.*

* cited by examiner

*Primary Examiner*—Emmanuel L Moise
*Assistant Examiner*—Michael Pyzocha
(74) *Attorney, Agent, or Firm*—Bardmesser Law Group

(57) ABSTRACT

A system, method, and computer program product for identifying malware components on a computer, including detecting an attempt to create or modify an executable file or an attempt to write to a system registry; logging the attempt as an auditable event; performing a malware check on executable files of the computer; if malware is detected on the computer, identifying all other files created or modified during the auditable event, and all other processes related to the auditable event; terminating the processes related to the auditable event; deleting or quarantining the executable files created or modified during the auditable event; and if the deleted executable files include any system files, restoring the system files from a trusted backup. Optionally, all files and processes having a parent-child relationship to a known malware component or known infected file are identified. A log of auditable events is maintained, and is recoverable after system reboot.

16 Claims, 5 Drawing Sheets

METHOD AND SYSTEM FOR DETECTION OF PREVIOUSLY UNKNOWN MALWARE COMPONENTS

BACKGROUND OF THE INVENTION

1. Field of the Invention

The present invention is related to anti-malware technology, and more particularly, to detection and identification of new or modified malware components when those components have not yet been added to malware databases by anti-malware software vendors.

2. Description of the Related Art

One of the issues involved in modern anti-virus technology is the fact that anti-virus and anti-malware databases get updated with a certain delay, after a new malware/virus appears. This is a particularly acute problem when multiple different malware components infect a computer at one time. For example, a typical such scenario is where a browser on a local computer is infected with a small downloader file. The small downloader file then contacts a server, to download a bigger downloader file. The second downloader file then downloads a number of malware components, often between 10 and 20 distinct components. These can include malware for sending out spam, various Trojans, identity theft malware, and so on.

Of these multiple components, some are already known to anti-malware databases and anti-malware software vendors, but frequently not all of the components are known. Thus, even upon a detection of infection by the malware, the anti-virus software "cures" the computer, but only of those components which are known to it. Once the "cure" is complete, the anti-malware software thinks that the incident is over, and computer operations proceed as before. However, those malware components that were unknown to the anti-malware software remain, often for days, performing their activities without the user being aware of it.

Accordingly, there is a need in the art for a system and method that addresses situations where multiple components infect a computer as part of a single incident, particularly those where not all of the components are recognized as malware by the anti-virus/anti-malware software.

SUMMARY OF THE INVENTION

The present invention is intended as a method and system for detecting unknown malware components that substantially obviates one or several of the disadvantages of the related art.

In one aspect of the invention there is provided a system, method, and computer program product for identifying malware components on a computer, including detecting an attempt to create or modify an executable file or an attempt to write to a system registry; logging the attempt as an auditable event; performing a malware check on executable files of the computer; if malware is detected on the computer, identifying all other files created or modified during the auditable event, and all other processes related to the auditable event; terminating the processes related to the auditable event; deleting or quarantining the executable files created or modified during the auditable event; and if the deleted executable files include any system files, restoring the system files from a trusted backup. Optionally, a similar attempt at cure can be performed not just for system files, but for all other executable files as well. Optionally, all files and processes having a parent-child relationship to a known malware component or known infected file are identified. A log of auditable events is maintained in a secure storage that is inaccessible to user applications. The log is stored in persistent storage and is recoverable after system reboot.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
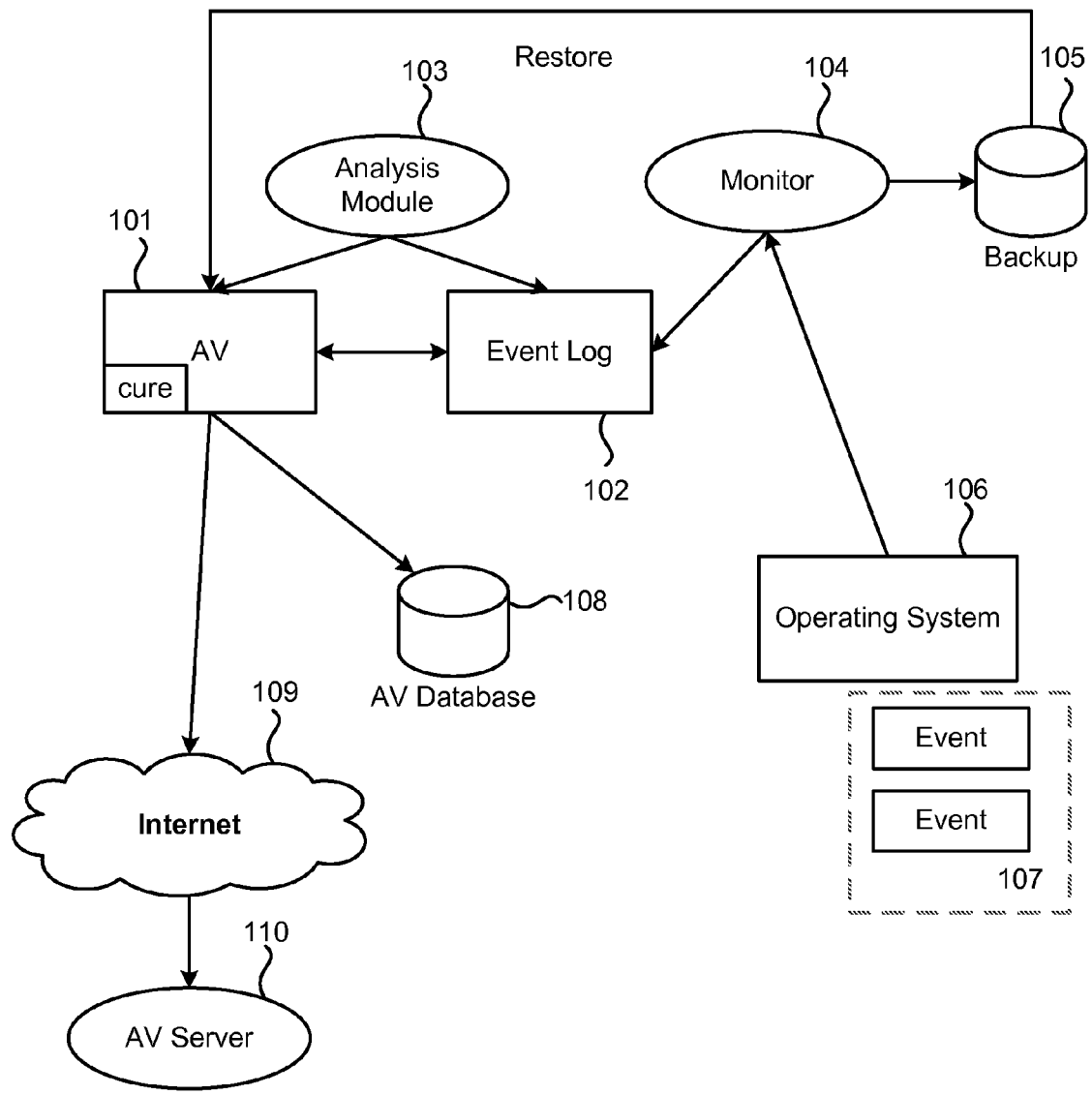
FIG. 1 illustrates one exemplary embodiment of a system configuration of the invention.

Reference will now be made in detail to the preferred embodiments of the present invention, examples of which are illustrated in the accompanying drawings.

The present approach is therefore based on logging events that relates to "interesting files", such that a malware infection incident can be reconstructed from the logs, even where not all of the installed malware components were previously known to the anti-virus/anti-malware software. Specifically, the items of interest are attempts to write to system registry and attempts to create or modify executable files, such as .exe files, scripts, batch files, and so on. With the log of such events being kept, there is a possibility of reconstructing, at a later date, not only the fact that some files were infected with known malware variants, but also the fact that other files were installed, or altered in some fashion, leading one to conclude that these files, with a relatively high degree of probability, represent infected or malware files.

It should also be noted that the number of such executable files, in typical computer systems, is relatively finite—most computers have a few dozen, to perhaps a few hundred such executable files, and attempt to write to these files are relatively uncommon, compared to attempt to write to a file generally. Thus, most computers often have hundreds of thousands of files at any given time (particularly with internet searching and caching of various small files by the browsers), but these files are not executable files, and are generally of little interest under the present circumstances. On the other hand, attempts to create a new executable file is a relatively rare event (very few users, on a routine basis, download and install new programs—this is, in fact, a fairly uncommon event, as far as the "life" of the computer system is concerned.

Also, attempts to modify existing executable files are also not that common. Even many patches, such as those routinely done by Microsoft Corp. that relate to the operating system or the more common Microsoft software, such as MS Word, MS Excel, and so on, do not happen with a very high frequency. Thus, it is not expected that the size of a log file that tracks these events is unmanageably large.

When an infection incident is detected, it is therefore possible to identify the fact of the infection from the presence of at least one known malware component, and then, working backwards, to identify the "parentage" of the infection—in other words, identify the process that created the file (or, if the malware resides only in memory, identify the process that spawned the infected or malicious process), and then identify all other executable files and processes that have the same parent, or belong to the same parent-child tree, in the sense of being spawned by the malicious process, or a child of the malicious process. Alternatively, a subset of all known processes that have a parent-child relationship to a known infected process, or to any known process, or a to any system process, can be identified.

In many cases, where multiple such files were created during a relatively short amount of time, and where some of these files are known to the malicious files, there is a high degree of probability that the other remaining files are also malicious files, even if they are not known as such to the anti-malware software. Thus, such suspect files can be deleted, or quarantined, or sent to the anti-virus vendor for analysis, and/or the user can optionally be given the choice to delete these files (once he is informed of the fact of the infection).

Note also that even if the malware component attempts to mask its existence by changing the time stamp maintained by the file system (where the timestamp relates to the last time that a particular executable file was modified), this would not help the malware component, because the log discussed herein is maintained separately, and all of the malware files that were installed (or where existing files were infected) will still be identified as such, through their association with the event, in the log.

Note also that the approach described herein addresses another problem, where after the infection occurs, the system is rebooted. In that case, any information regarding such events that is maintained by conventional systems is lost. Conventionally, there is no way to reconstruct what happened during that particular incident, other than to hope that all of the malware components are known to be anti-virus software. In the present case, even if the system is restarted, the log files can still "tell the tale" of what happened, and will permit deletion of the newly installed malware components, or restoration from backup of those executable files that are needed by the system (or user applications that were previously installed).

Note also that this is an area where the field of anti-virus technology intersects with what is sometimes known as computer forensics, where an attempt is made to reconstruct what happened to a particular system that got infected. Frequently, computer forensics is a very laborious process, precisely because no accurate log files are maintained by conventional systems. In this case, by maintaining the log files and the chronology of events relating to file creation, file modification and process spawning (including the parent-child relationships involved), and by keeping track of which files were installed by which process (and when), and which process was spawned by which process, and when (i.e., the parent-child relationships, in the form of a hierarchical tree), the task of computer forensics and auditing is made much easier.

FIG. 1 illustrates one exemplary embodiment of the invention. As shown in FIG. 1, on a computer system, an event monitor 104 is installed, to monitor events that are of interest, such as those described earlier—in other words, attempts to create or modify executable files, attempts to write to the system registry, etc. Also shown in FIG. 1 is the operating system 106, on which the auditable events 107 can occur.

The event monitor 104, upon detection of an interesting "event," logs the event in the event log 102. The event log 102 is used by the analysis module 103, which is used to trace the history of the event—in other words, all the files that were created or modified during that event, all of their parent/children processes, and so forth.

The antivirus module 101 is responsible for detecting the presence of known malware. Also, with the help of the event log 102 and the analysis module 103, the antivirus module 101 and delete, quarantine, or cure infected files. For example, if an executable file is one that is needed by the system, such as system files, "normal" executable files (Internet Explorer, Microsoft Word, and so on), the antivirus module 101 can restore trusted versions of these files from backup 105. The antivirus module uses a database 108 that stores information about malicious files, and also can add to the database those files which were detected as part of an event, even if those files were not yet specifically identified as being malicious components. A reboot can also be performed from trusted storage, and a log of auditable events, which can be stored in persistent storage and/or secure storage that ordinary user applications cannot access, will be available after reboot.

Furthermore, the antivirus module connects, through a network, such as the Internet 109, to a server 110, which may belong to the antivirus software vendor, in order to communicate information about an event—for example, by providing a copy of the log, or providing a copy of the malicious components or presumptive malicious components that were previously unknown, but were identified as a result of the event.

Figure 2:
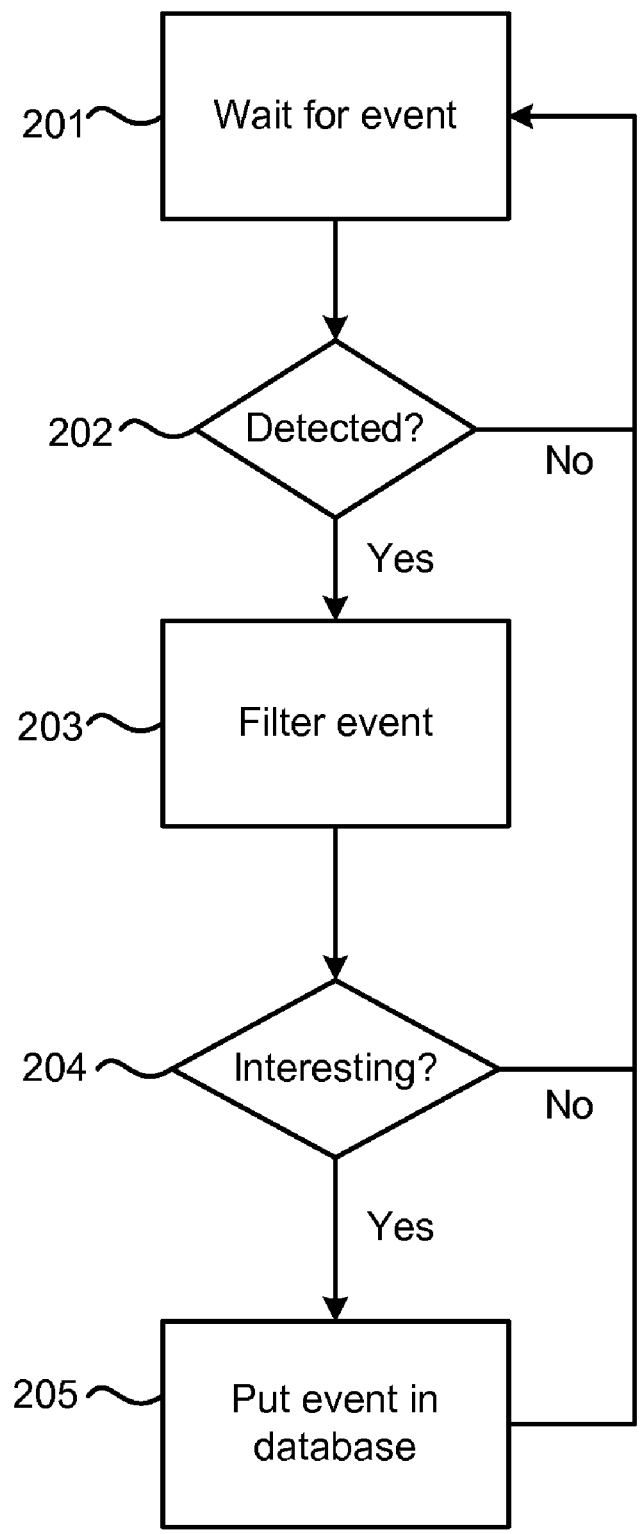
FIG. 2 illustrates, in flowchart form, an exemplary algorithm of one embodiment of the invention.

FIG. 2 illustrates, in flowchart form, an exemplary algorithm of one embodiment of the invention. As shown in FIG. 2, the system waits for an event, such as invoking a system API to create or modify a file, or to write to the system registry (step 201). If an event is detected, see step 202, then, in step 203, the events are filtered. If, in step 204, the event is determine to be an interesting event, i.e., one that involves executable files or the system registry keys, then, in step 205, the event is added to the database/log 102. The process then returns to step 201.

Figure 3:
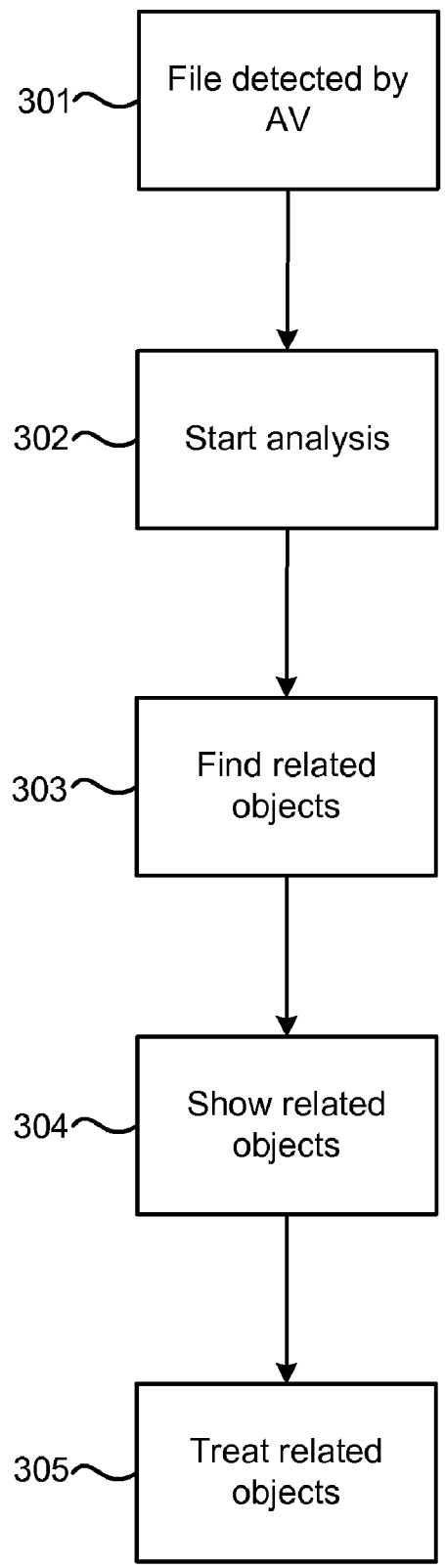
FIG. 3 illustrates the handling of an event that has been determined to result from malware activity.

FIG. 3 illustrates the handling of an event that has been determined to result from malware activity. In step 301, one of the files has been determined, by the antivirus software 101, to be infected. In step 302, the analysis starts, in order to determine what other files might be affected. In step 303, based on the events log, other files associated with the event, as well as the processes that generated or modified those files, as well as children of those processes, are identified. In step 304, optionally, the user is informed of these files, and asked what actions he wants to take. In step 305, the infected files/malware components are handled—for example, by deletion, by quarantine, by shutting down the infected or malicious process, or by restoring a trusted copy of the file from backup.

Figure 4:
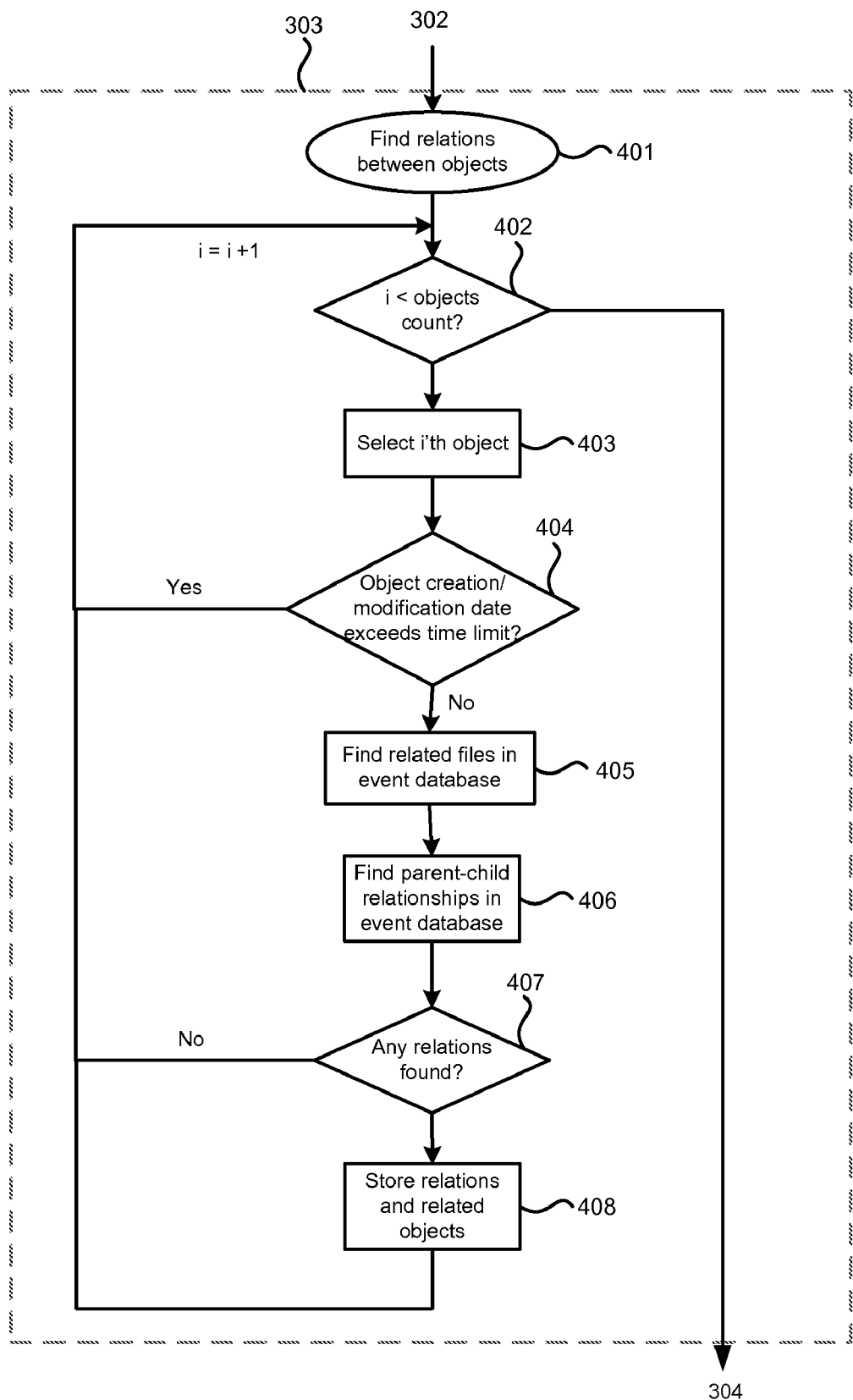
FIG. 4 illustrates additional detail of the process involved in identifying relationships between objects and executable files/processes.

FIG. 4 illustrates, in additional detail, the process involved in identifying related objects (see step 303 in FIG. 3). As shown in FIG. 4, in step 401, relationships between objects of interest are identified, using the log 102. In step 402, a counter is checked to see if there are any remaining objects left to process. In step 403, the next object is selected. In step 404, the time that the object was created or modified is checked, to see if the time is close to an event of interest. If it is, then, in step 405, all related files are identified in the event database 105. In step 406, parent/child relationships are identified in the database. In step 407 if there are such relationships, then, in step 408, the relationships and the identifiers of the object are stored. Otherwise, the process returns back to step 402.

Figure 5:
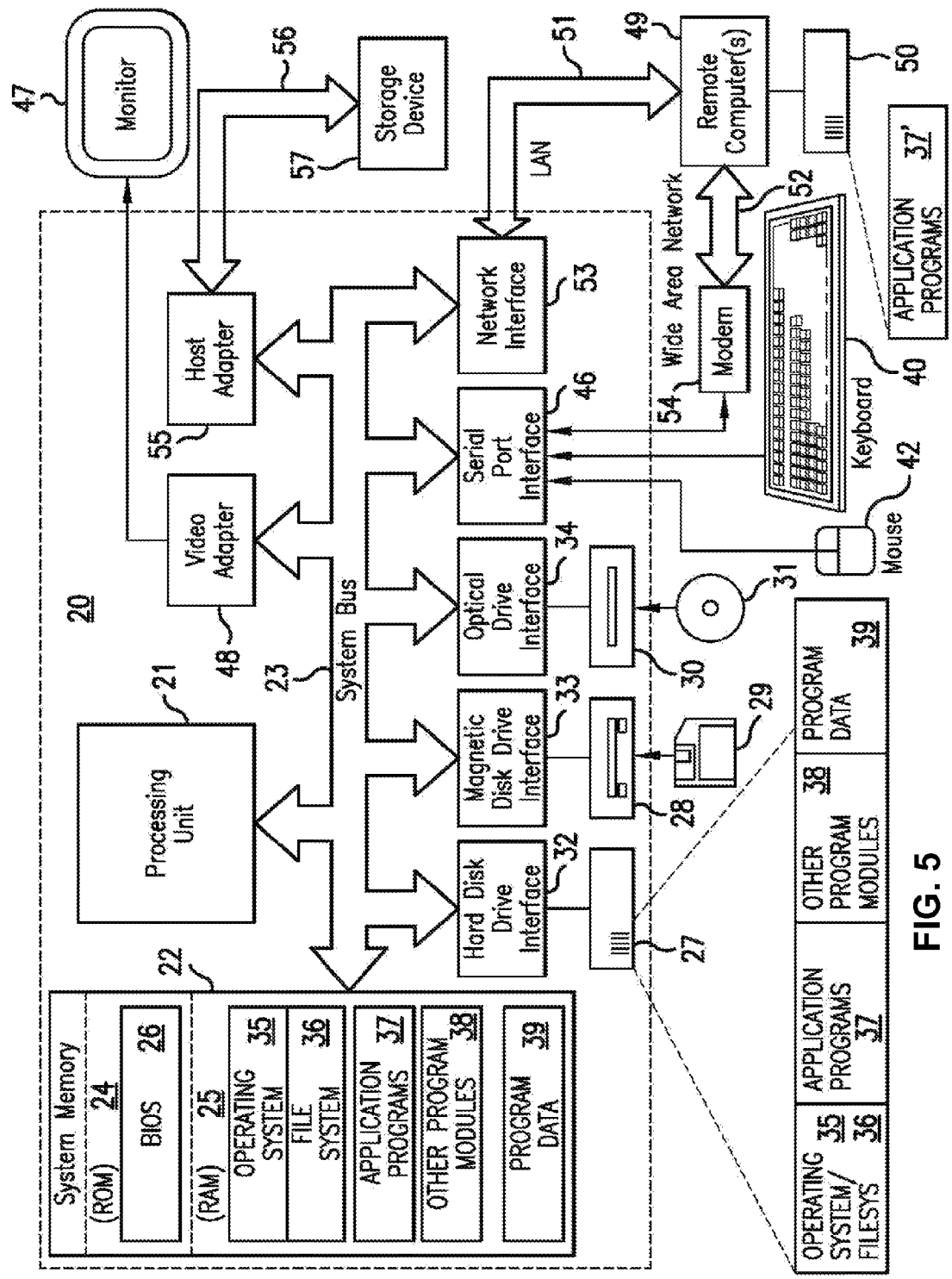
FIG. 5 illustrates a schematic of an exemplary computer system on which the antimalware invention can be implemented.

With reference to FIG. 5, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the personal computer 20, such as during start-up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A method for identifying malware components on a computer, the method comprising:
   (a) detecting an attempt by a process to create or modify an executable file or an attempt to write to a system registry;
   (b) logging the attempt as an auditable event;
   (c) performing a malware check on executable files of the computer,
   (d) if malware is detected on the computer, identifying all other files created or modified by the process of step (a), and all other processes related to the auditable event, including processes having a parent-child relationship to the process of step (a), in both up and down directions of the parent-child tree, including processes that are other children of the processes in the parent-child tree, including files created or modified by processes that belong the parent-child tree of the process of step (a), and including processes launched from those files;
   (e) terminating the processes related to the auditable event;
   (f) deleting or quarantining the executable files identified in step (d); and
   (g) for any deleted executable system files, restoring the system files from a trusted backup.

2. The method of claim 1, wherein steps (b) and (d) further comprise identifying all files and processes having a parent-child relationship to a known malware component or a known infected file.

3. The method of claim 1, wherein, a log of auditable events is maintained in a secure storage that is inaccessible to user applications, the log including a record of all the files and processes identified in step (d).

4. The method of claim 3, wherein, the log is stored in persistent storage and is recoverable after system reboot, including recovery of information relating to the files and processes and their parent-child relationships identified in step (d).

5. The method of claim 1, wherein steps (b) and (d) further comprise identifying all files and processes having a parent-child relationship to any known process.

6. The method of claim 1, wherein steps (b) and (d) further comprise identifying all files and processes having a parent-child relationship to any system process.

7. The method of claim 1, wherein steps (b) and (d) further comprise identifying all files and processes having a parent-child relationship to a subset of processes.

8. The method of claim 1, wherein steps (b) and (d) further comprise identifying all files and processes having a parent-child relationship to a newly installed program.

9. The method of claim 1, wherein steps (b) and (d) further comprise identifying all files and processes having a parent-child relationship to a newly installed program, for multiple program starts.

10. The method of claim 1, wherein steps (b) and (d) further comprise identifying a chronology of events relating to spawning of new processes, and identifying malware components based on the chronology.

11. The method of claim 1, wherein steps (b) and (d) further comprise identifying a chronology of events relating to creation of new files, and identifying malware components based on the chronology.

12. A system for identifying malware components on a computer, the system comprising:
(a) a processor;
(b) memory;
(c) computer code loaded into the memory for implementing the method of claim 1.

13. A system for identifying unknown malware components, the system comprising:
a processor;
memory;
antimalware software loaded into them memory for executing on the processor, the antimalware software identifying processes associated with known malware components;
a database of the known malware components accessible by the antimalware software;
an event logger to detecting and logging suspected infection events relating to attempts by a process to modify or create executable files and attempts to write to a system registry; and
an analysis module for identifying files related to the infection events, if a known malicious component is identified by the antimalware software, including processes having a parent-child relationship to the process associated with the malware component, in both up and down directions of the parent-child tree, including processes that are other children of the processes in the parent-child tree, including files created or modified by processes that belong the parent-child tree of the process associated with the malware component, and including processes launched from those files,
wherein the antimalware software quarantines or deletes the files related to the infection events.

14. The system of claim 13, wherein the event logger maintains a record of all files and processes having a parent-child relationship to each process or executable file in a computer system.

15. The system of claim 13, wherein the event logger maintains a log of auditable events in a secure storage that is inaccessible to user applications.

16. The system of claim 15, wherein, the log is stored in persistent storage and is recoverable after system reboot, including identification of parent-child relationships identified by the tree.

* * * * *